United States Patent
Chen

(10) Patent No.: US 7,483,551 B2
(45) Date of Patent: Jan. 27, 2009

(54) METHOD AND SYSTEM FOR IMPROVED UNRESOLVED TARGET DETECTION USING MULTIPLE FRAME ASSOCIATION

(75) Inventor: Hai-Wen Chen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 638 days.

(21) Appl. No.: 10/938,607

(22) Filed: Sep. 13, 2004

(65) Prior Publication Data
US 2005/0185824 A1    Aug. 25, 2005

Related U.S. Application Data

(63) Continuation-in-part of application No. PCT/US2004/005325, filed on Feb. 24, 2004.

(51) Int. Cl.
G06K 9/00 (2006.01)
H04N 5/225 (2006.01)

(52) U.S. Cl. .................. 382/107; 382/103; 348/169

(58) Field of Classification Search .......... 382/103, 382/107, 236, 260, 262, 287; 348/169, 170, 348/171, 172, 208.14; 342/76, 90, 95, 96, 342/99, 357.07, 424, 426, 427
See application file for complete search history.

(56) References Cited

U.S. PATENT DOCUMENTS

| | | | |
|---|---|---|---|
| 4,937,878 A | * | 6/1990 | Lo et al. ................ 382/103 |
| 5,001,650 A | * | 3/1991 | Francis et al. ............ 348/169 |
| 5,027,413 A | * | 6/1991 | Barnard .................. 382/103 |
| 5,657,251 A | | 8/1997 | Fiala |
| 5,960,097 A | * | 9/1999 | Pfeiffer et al. ............ 382/103 |
| 6,072,889 A | * | 6/2000 | Deaett et al. ............. 382/103 |
| 6,192,156 B1 | * | 2/2001 | Moorby ................. 382/236 |
| 2002/0071595 A1 | | 6/2002 | Pirim |
| 2004/0081335 A1 | | 4/2004 | Kondo et al. |
| 2004/0125984 A1 | | 7/2004 | Ito et al. |

* cited by examiner

*Primary Examiner*—Abolfazl Tabatabai
(74) *Attorney, Agent, or Firm*—Birch, Stewart, Kolasch & Birch, LLP

(57) ABSTRACT

A method and apparatus for detecting and tracking objects using infrared sensors are disclosed. The system is preferably an IRST (infrared, search and tracking) system, and it includes at least one or more infrared sensors, a receiver and a processor. The receiver receives image data from the infrared sensors having a predetermined field of view. The image data includes a reference image, which is preferably a current frame, and a search image, which is preferably a previous frame. The image data is classified to determine whether the image data includes relatively low clutter or relatively high clutter. When the image data includes relatively high clutter of the type typically found in an urban area, the processor performs spot time-difference processing on multiple frames of the image data. The processor detects a moving object from the multiple frames of image data, and it is also capable of detecting stationary objects and random objects.

19 Claims, 16 Drawing Sheets

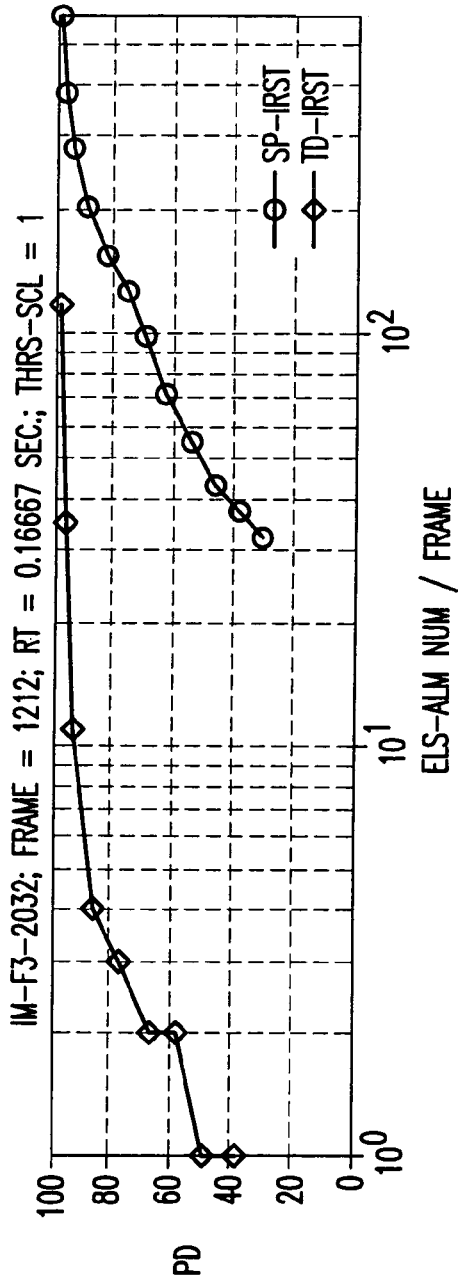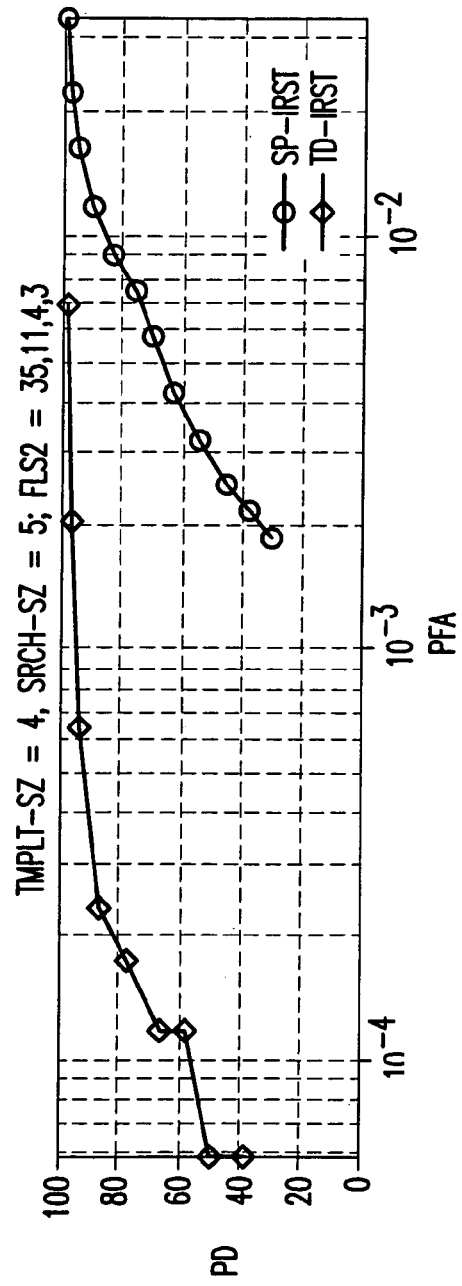
FIG.15A
FIG.15B

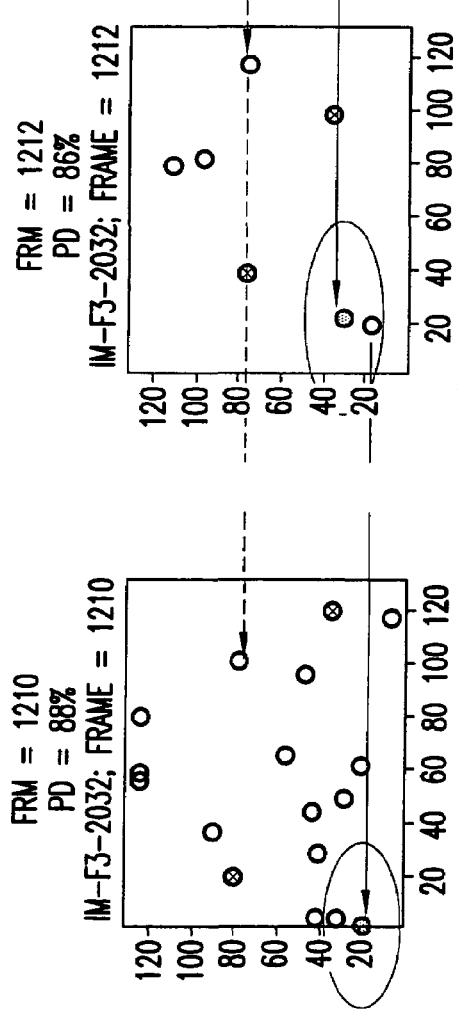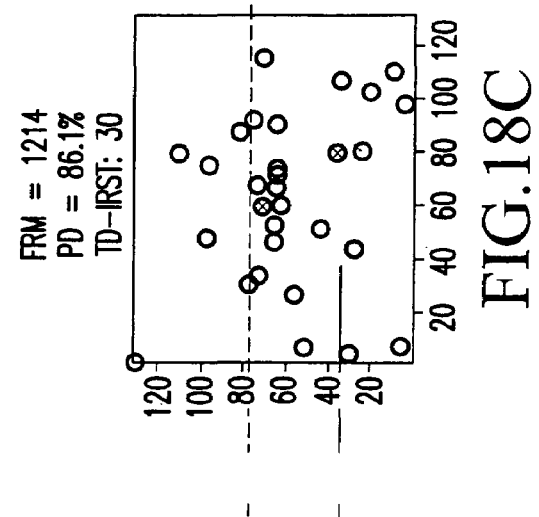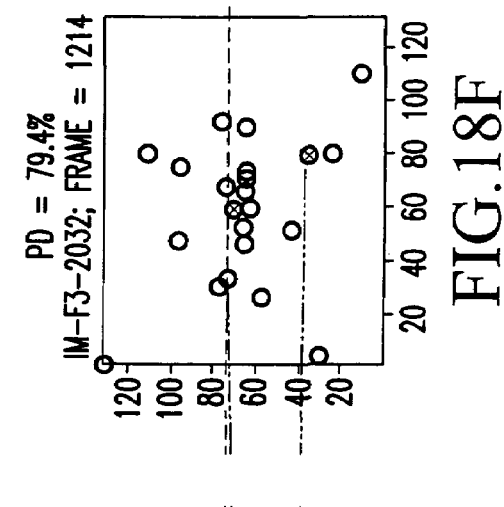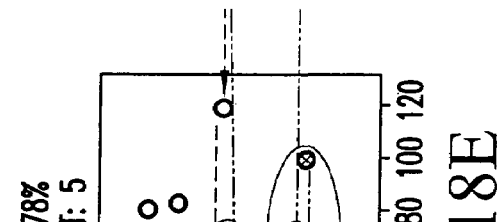
FIG.18A  FIG.18B  FIG.18C
FIG.18D  FIG.18E  FIG.18F

METHOD AND SYSTEM FOR IMPROVED UNRESOLVED TARGET DETECTION USING MULTIPLE FRAME ASSOCIATION

CROSS REFERENCE

The present application is a continuation-in-part of International Application Number PCT/US2004/005325, filed Feb. 24, 2004, the contents of which is incorporated herein by reference.

BACKGROUND OF THE INVENTION

1. Field of the Invention

The present invention relates generally to image processing. It particularly relates to an image processing target detection system and method that uses adaptive spatial filtering and time-differencing processes to detect and track targets within various background environments.

2. Description of the Related Art

Passive IR (Infrared) sensors are widely used to detect the energy emitted from targets, backgrounds, incoming threats, and the atmosphere for a plurality of applications including military surveillance, missile target and detection systems, crop and forest management, weather forecasting, and other applications. The measures of performance for passive IR sensors include signal-to-noise ratio (S/N), radiation contrast, noise-equivalent temperature difference (NEDT), minimum resolvable temperature difference, and other parameters. These sensors may be designed to enhance one or more of these parameters for optimum performance during a particular application.

Particularly, one type of passive IR sensor, the IRST sensor (Infrared search and track), locates and tracks objects by capturing the energy emitted within the field of view (FOV) or field of regard (FOR) of the sensor. However, IRST sensors are commonly designed to operate with a small noise-equivalent temperature difference (NEDT) to detect small target-to-background contrast temperatures, and therefore heavy background clutter may strongly hinder accurate target detection and tracking and lead to a higher probability of false alarm ($P_{fa}$). Importantly for threat detection applications, it is useful for the IRST sensor to detect, declare, and track airborne targets at a long distance (usually larger than 50 km) before the threat can see the intended target, and therefore the IRST sensor performance may be enhanced using a large instantaneous field of view (e.g., 360-degree hemisphere in azimuth and 50 to 90 degrees in elevation). However, the large number of scene pixels produced by an IRST sensor may require computer-controlled image data processing to separate the large number of false targets from the true targets. As shown in FIG. 1A, a common target detection and tracking scenario for military applications may be a fighter jet 109 attempting to detect and track incoming fighter jets 122 and/or incoming missiles (bombs) 124 that may be enemy-controlled.

Commonly, the IRST sensor uses two image data processing techniques for target (threat) detection and tracking which include SpatialIRST and ChangeIRST. FIG. 1B illustrates an exemplary SpatialIRST image processing system 100 found in the prior art. During operation, an image 102 input from an IR sensor (not shown) is initially spatially convolved by a matched filter 104 to generate a spatially filtered image output. The matched filter 104 may be generally designed using a well-known system point spread function (PSF) since at a long distance an incoming airborne target may be considered as a point radiant source. A point spread function maps the intensity distribution for the received signal at the sensor generated from the point source of light (airborne target at a long distance). The spatially filtered output may be divided by a local background estimation (provided by an estimator 106) using a divider 108 which provides an output image to a CFAR (constant false alarm rate) detector 110. Use of a CFAR detector allows for setting of one or more detection threshold levels to provide a maximum (tolerable) false alarm rate. The detector 110 provides an output signal 112 indicating detection.

However, SpatialIRST may produce a large number of false alarms when the background clutter contains high spatial frequency components. Also, when the background contains both low and heavy clutter sub-regions, traditional SpatialIRST may produce increased false alarms for the heavy clutter sub-regions which also reduces the probability of detection for the low clutter sub-regions.

For light or medium background clutter, generally the SpatialIRST system works well to detect and track targets, but performance suffers with heavy to extremely heavy background clutter (e.g., urban and earth object clutter) leading to a high $P_{fa}$. Under these conditions, commonly a ChangeIRST image processing system may be used which employs a temporal time-differencing image processing technique which is useful for moving (e.g., airborne) targets. FIG. 2 illustrates an exemplary ChangeIRST image processing system 200 found in the prior art. During operation, a reference image (current image frame) 202 and a previous image (the search image) 204 are filtered using a high-pass filter 206 and pixel-wisely registered using a registering device 208 at a particular re-visit time (RT). Pixel registration is a well-known technique to align the received images for the same scene. Commonly, a base image is used as a comparison reference for at least one other (input) image, and the registration process brings the input image into alignment with the base image by applying a spatial transformation to the input image. Using a subtractor 210, the registered search image may be subtracted from the reference image to suppress background clutter, and the output difference image may be fed to a CFAR (constant false alarm rate) detector 212 to generate a detection output signal 214.

Alternatively, another ChangeIRST image processing system 300 found in the prior art may be used as shown in FIG. 3. During operation of the alternative arrangement 300, an original large image 302 is under-sampled using a sampler 304 into a smaller matrix containing match point elements. These match point elements are registered using registering device 208, and the registration locations are interpolated back to the original space-domain. After interpolation, operation continues similar to FIG. 2 with the subtractor 210 to generate a difference signal input to CFAR detector 212. This alternative ChangeIRST arrangement 300 uses a multi-resolution approach to reduce the throughput (computing load) requirement for the image registration. However, the registration accuracy is decreased.

International Patent Application Number PCT/US2004/005325, filed Feb. 24, 2004, entitled "A METHOD AND SYSTEM FOR ADAPTIVE TARGET DETECTION" discloses an adaptive long range IRST detection processor that contains an adaptive spatial filtering process (Adaptive SpatialIRST) as well as a spot time-differencing process (Spot ChangeIRST) for heavy background clutter suppression.

FIG. 4 is a flow process diagram of an exemplary adaptive IRST image processing system disclosed in International Patent Application Number PCT/US2004/005325. Advantageously, a controller may be used to control the flow process steps of the IRST imaging system. At step 402, a reference (current) image frame and a search (previous) image frame may be input, from an IRST sensor, into the system using a receiver and undergo image pre-processing including noise filtering and other pre-processing.

In an exemplary embodiment, the reference image may be received at a time (t) and the previous image may be received at a previous time (t−n). At step 404, the reference image is input to an adaptive spatial filtering path (further described below in reference to FIG. 5) for detection of an object within the sensor field of view (e.g., impending threat such as launched missiles, etc.). At step 406, a decision block is reached where it is determined whether the background clutter in the field of view qualifies as high (heavy) clutter in accordance with a predetermined threshold. If yes, then processing continues at step 408 where spot time-differencing processing (spot ChangeIRST) is performed on the reference and search images to reduce the stationary detections due to clutters (such as building and rocks, etc.) and to pass moving detections (such as airborne targets).

Following at step 410, the confirmation detection from the spot time-difference step (step 408) may be combined with the detections with low clutter ("no" decision at step 406) from the spatial filtering step (step 404) to produce a detection summation output. At step 412, extended image processing including classification, identification, and tracking may occur using the summation detection result and the reference image as inputs to initiate and maintain tracking of the detected object.

FIG. 5 is a block diagram of exemplary adaptive IRST image processing system 500 using adaptive spatial filtering. Advantageously, adaptive IRST image processing system 500 may be used for the detection/search scenario illustrated in FIG. 1A to replace the prior art systems 100, 200, 300 shown in FIGS. 1B, 2, 3. A controller 509 may be used to control the operation of the system 500.

As shown in FIG. 5, a reference (current) image frame 502 may be input from an IRST sensor field of view (not shown) to a spatial, matching filter 504 using a receiver 507. Advantageously, spatial filter 504 may perform high-pass filtering using a smaller template (incoming pixel frame size for the filter) which enables faster detection by requiring less processing than for larger size templates. The filter 504 operates to use a previously detected object (e.g., tank) as the center for the succeeding pixel frame of a limited size (smaller template) which accelerates accurate correlation and detection. Also, spatial filter 504 may subtract the original image from a local mean to function as an anti-mean high-pass filter.

Additionally, a background estimator 506 may estimate the noise of the background clutter of the IRST sensor field of view using the same anti-mean filter 504 or using a different high-pass filter (e.g., the filter of a point spread function), and divide (using divider 508) the filtered image data input by the background noise estimation to produce an output image signal input to a CFAR (constant false alarm rate) detector 510. Use of a CFAR detector allows for setting of one or more detection threshold levels to provide a maximum (tolerable) false alarm rate for the system 500. Advantageously, anti-mean filter 504 with a smaller template may reduce the false alarm rate when the background clutter of the sensor field of view contains high frequency components.

Also, the reference image data 502 may be input to a local/regional sigma (standard noise deviation) estimator 512 to help estimate the standard deviation for noise within the background clutter for the field of view. The estimator 512 divides the image data 502 into a plurality of different spatial sub-regions and determines (measures) the SNR and standard noise deviation for each sub-region including a local region. Following the estimator 512, threshold device 514 may set the SNR threshold levels for each sub-region based on the measurements of the estimator 512. Following, the CFAR detector 510 may receive the noise estimation and SNR threshold levels, along with the filtered/divided image data signal output, to determine whether an object is detected (e.g., predetermined threat target) within the sensor field of view and produces a detection output signal 516.

Following generation of the detection output signal 516, image processing may continue using the spot time-differencing system 600 of FIG. 6. FIG. 6 is a block diagram of an exemplary adaptive IRST image processing system 600 using spot time-differencing in accordance with an embodiment of the present invention. As shown in FIG. 6, the reference image 502 and a search (previous) image 601 input to the spatial filter 504 of system 500 may be also input to a high-pass filter/background estimator device 602 for filtering and estimating of the noise level for the background clutter across the plurality of sub-regions within the sensor field of view. The processing of system 600 continues if high clutter is determined (step 406 from FIG. 4) for the particular sub-regions since advantageously spot time-differencing will be applied for detection confirmation in only high background clutter sub-regions. Following, the filtered reference and search image data 502, 601 are input to a registrator 604 for registering of pixel data for the input image data 502, 601 for proper alignment of images from the same scene (field of view). The registrator 604 compares the input image data 502, 601 with base image data to determine whether spatial transformation of the input image data is necessary for proper alignment with the base image data. Thereafter, a differencing component 606 may subtract the search image 601 from the reference image 502 to suppress background clutter, and the output difference image 603 fed to a CFAR detector 608 to generate a detection output signal 609 indicating whether an object (e.g., predetermined threat target) is detected in the sensor field of view.

As shown at step 412 of FIG. 4, extended image processing including classification, identification, and tracking may occur using the spatial filtering processing output, time-difference detection output, and original reference image data as inputs to initiate and maintain tracking of the detected object.

Although the adaptive long range IRST techniques of copending International Patent Application Number PCT/US2004/005325 provide a substantial improvement over conventional IRST techniques the adaptive long range IRST techniques are susceptible to temporal noise and random phasing of the same object falling down to different subpixel locations in the previous and current image frames. Accordingly, there is a need to provide an improved IRST system that is less subject to temporal noise and that provides high probability of detection in various background environments (light, medium, or heavy clutter) while maintaining low probability of false alarm.

SUMMARY OF THE INVENTION

The method and system of the present invention substantially overcome the previously mentioned problem of temporal noise by providing a multiple-frame-association process for a spot time-differing target detection and tracking system. The system is preferably an IRST (infrared, search and tracking) system, and it includes at least one or more infrared sensors, a receiver and a processor. Image data from the sensors includes a reference image and a search image. The image data is classified to determine whether the image data includes relatively low clutter or relatively high clutter. When the image data includes relatively high clutter of the type typically found in an urban area, the processor performs time-difference processing on multiple frames of the image data. The processor detects a moving object from the multiple frames of image data, and it is also capable of detecting stationary objects and random objects.

BRIEF DESCRIPTION OF THE DRAWINGS

FIGS. 15a and 15b are graphs illustrating ROC performance for Frame number 1212.

FIGS. 18a-18f include charts illustrating multiple frame association for moving target detections.

DETAILED DESCRIPTION OF THE INVENTION

Figure 7:
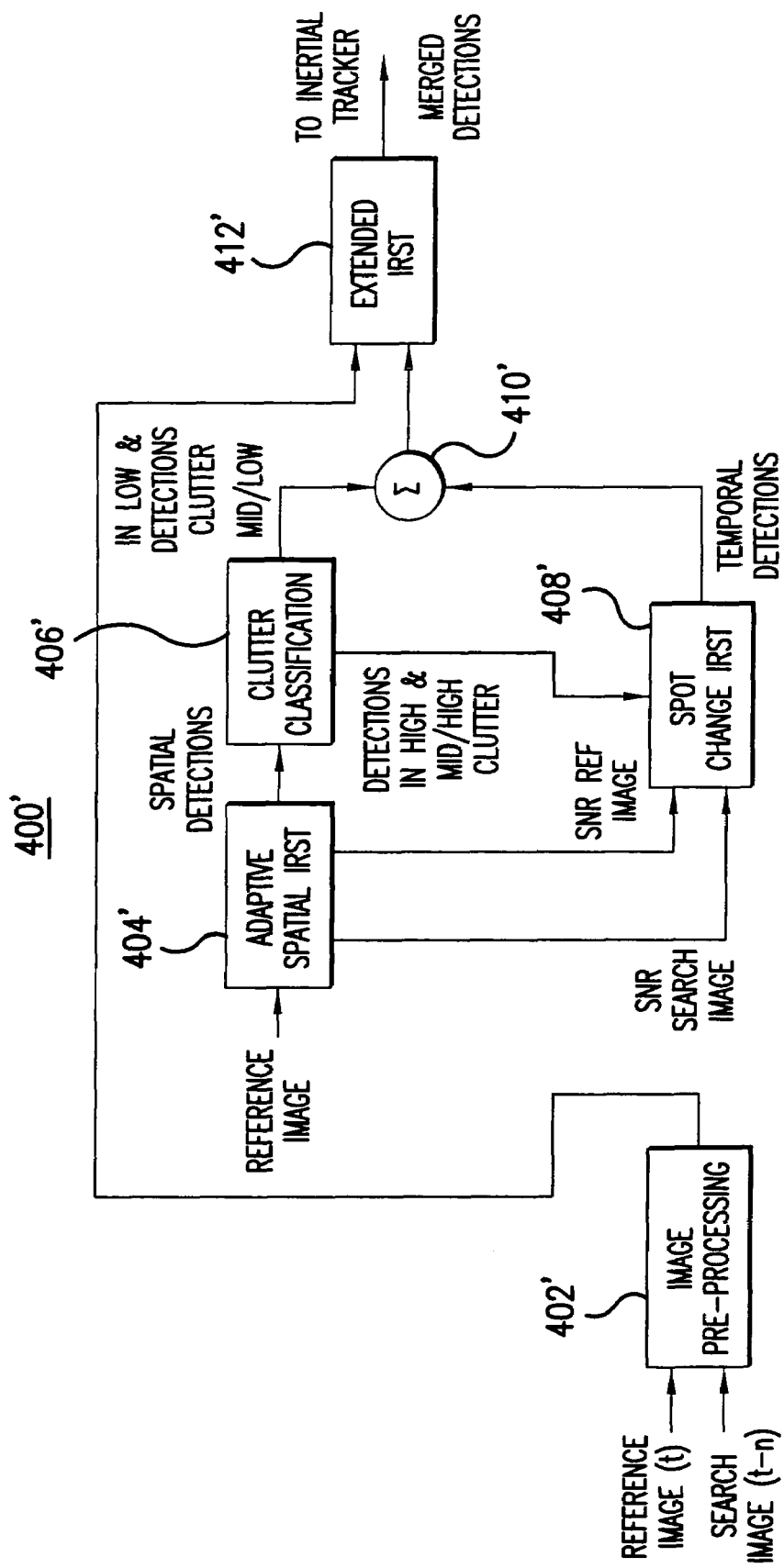
FIG. 7 is a flow process diagram of an improved IRST image processing system.

In order to facilitate the reader's understanding of the present invention, the following list of acronyms and their generally accepted meanings are provided:

Ac—Angle from center
CFAR—Constant False Alarm Rate
FOR—Field of Regard
FOV—Field of View
FPA—Focal Plane Array
IR—Infrared
IRST—Infrared Search and Track
LOS—Line of Sight
MFA—Multiple-Frame-Association
MTI—Moving Target Indicator
NEDT—Noise-Equivalent Temperature Difference
Pd—Probability of Detection
Pfa—Probability of False-Alarm
PSF—Point spread function
ROC—Receiver Operating Characteristics
RT—Re-visit Time
SMF—Small Military Fighter
S/N—Signal-to-Noise Ratio
STD—Spot Time-Differencing
µFlicks—A measure of radiance Referring now to FIG. 7, an improved IRST detection processor 400' is shown. The improved IRST detection processor 400' of FIG. 7 is similar to the IRST detection processor 400 of FIG. 4, and similar components or functions are provided with similar reference numbers having a prime symbol. The improved IRST processor 400' includes an image pre-processing function 402' and an adaptive SpatialIRST function 404'. Instead of conducting whole image registration, only the detection spots are preferably registered with the previous image for time-differencing. In a Spot ChangeIRST function 408', the spot time-differencing process is only conducted for the detection spots in high clutter sub-regions based on the local and regional Sigma estimation by the Adaptive SpatialIRST 404'. The reason is that in the low clutter situation, the ChangeIRST 408' performs worse than Spatial IRST 404', since in this situation the temporal noise will play a major role in the false alarm rate, and the time-differencing process increases the standard deviation of temporal noise by a factor of 40%.

It has been determined that for clutters ranging from medium to heavy (with background radiance from 40~110 µFlicks), at a Pd around 85%~90%, the false detection number for a 1024×1024 FPA ranges from several hundreds to a couple of thousands. Therefore, the first benefit of the present invention over a traditional design is the relatively large saving of the computational throughputs. For example, in older systems having a 256×256 match-point registration scheme, more than sixty five thousand (65536) local registrations are needed. On the other hand, for the new spot time-differencing scheme and for a Pd around 85%~90%, only a couple of thousand local registrations are needed.

A second benefit of the present invention over the traditional design or legacy system is that higher image registration accuracy can be achieved, since the present invention conducts the spot registration/correlation at the original space-domain without using the down-sampling match-point process and interpolation process. The third benefit is that the present invention can adaptively/automatically decide whether to conduct the time-differencing process for a specific detection or not. That is, the spot time-differencing process only conducts for the detection spots in high clutter sub-regions based on the local and regional Sigma estimation by the Adaptive SpatialIRST 404'.

Figure 1A:
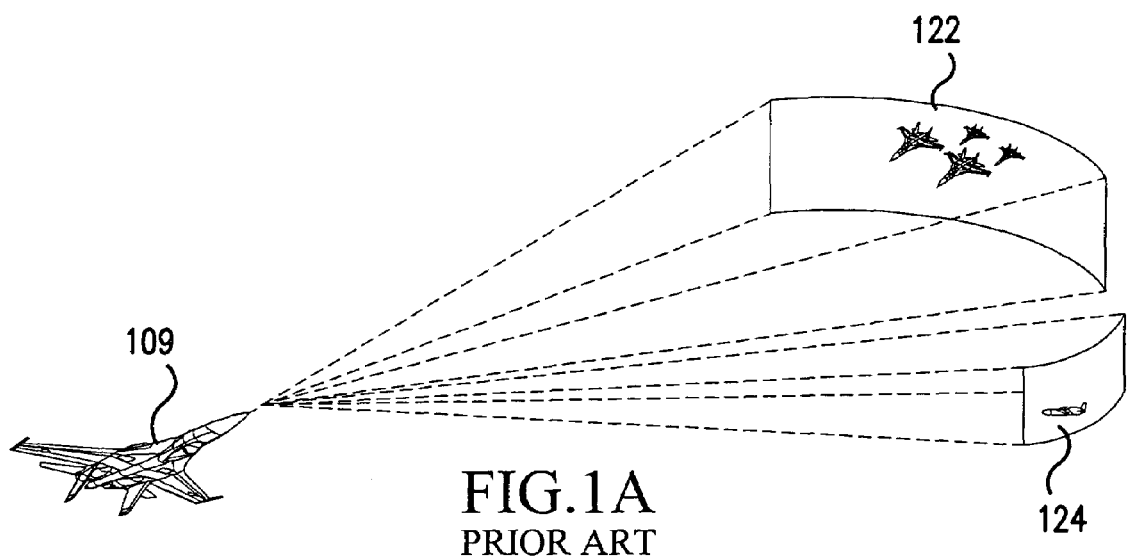
FIG. 1A is a block diagram of an exemplary target detection and tracking scenario for military applications found in the prior art.
Figure 1B:
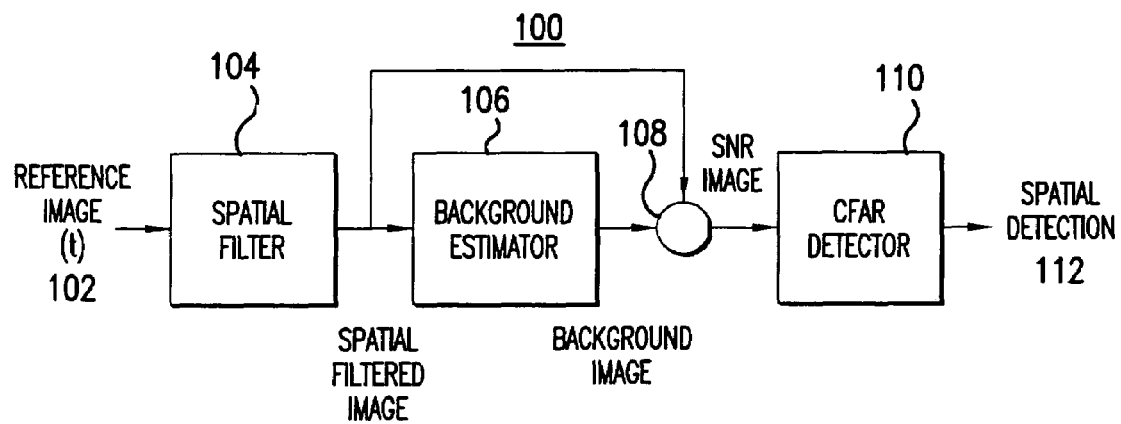
FIG. 1B is a block diagram of an exemplary target detection image processing system using spatial filtering found in the prior art.
Figure 2:
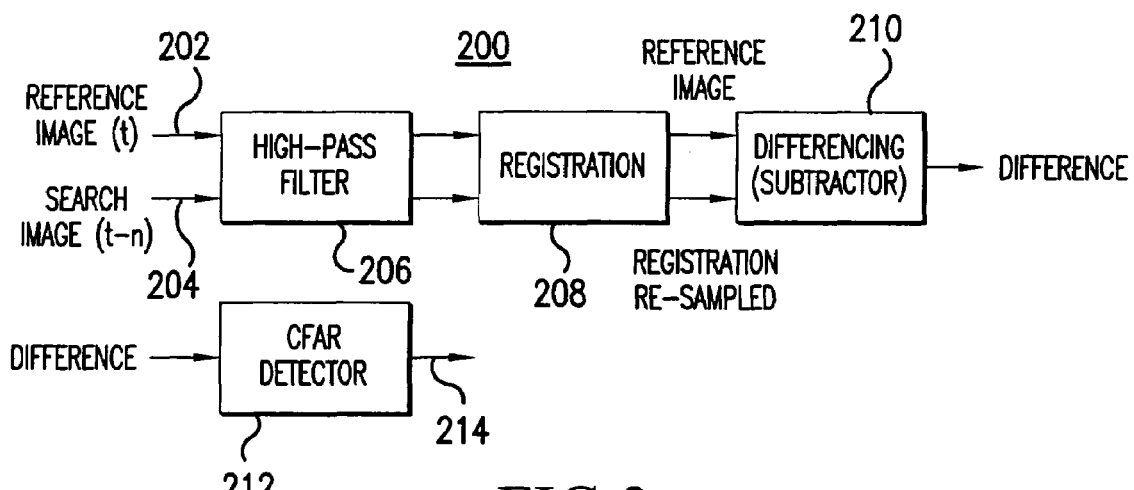
FIG. 2 is a block diagram of an exemplary target detection image processing system using time-differencing found in the prior art.
Figure 3:
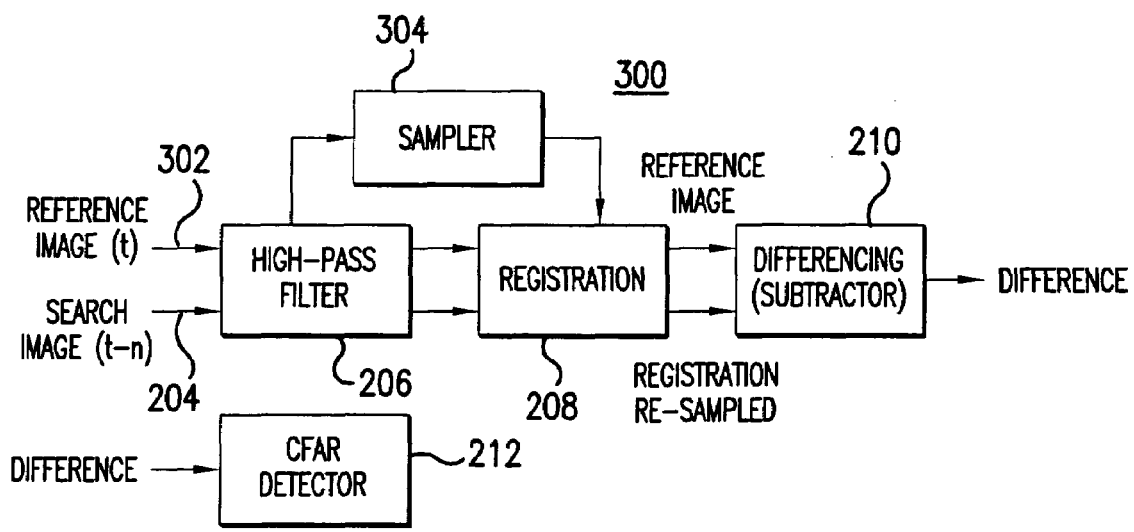
FIG. 3 is a block diagram of a exemplary, alternative target detection image processing system using time-differencing found in the prior art.
Figure 4:
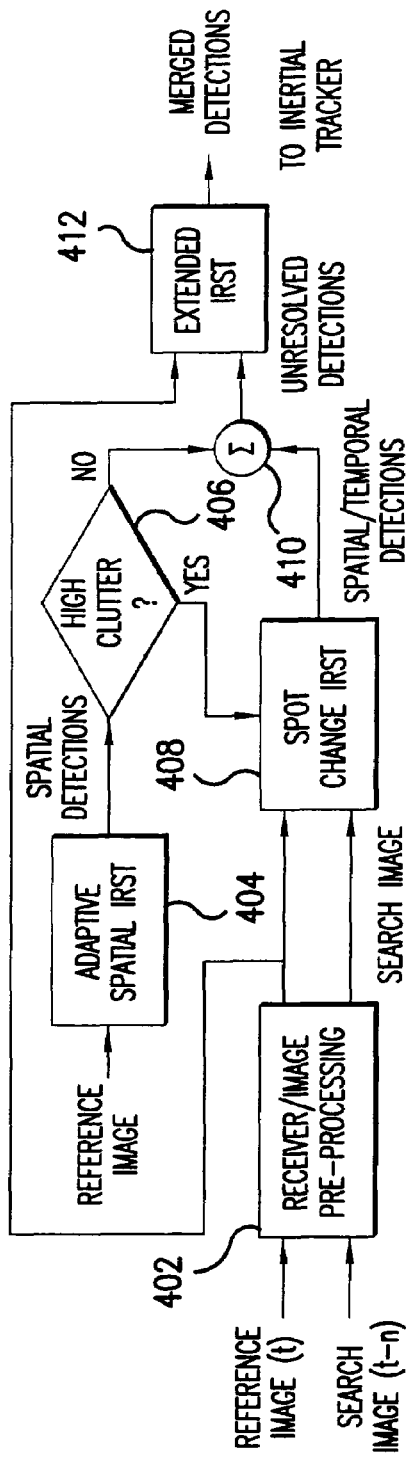
FIG. 4 is a flow process diagram of an exemplary adaptive IRST image processing system.
Figure 5:
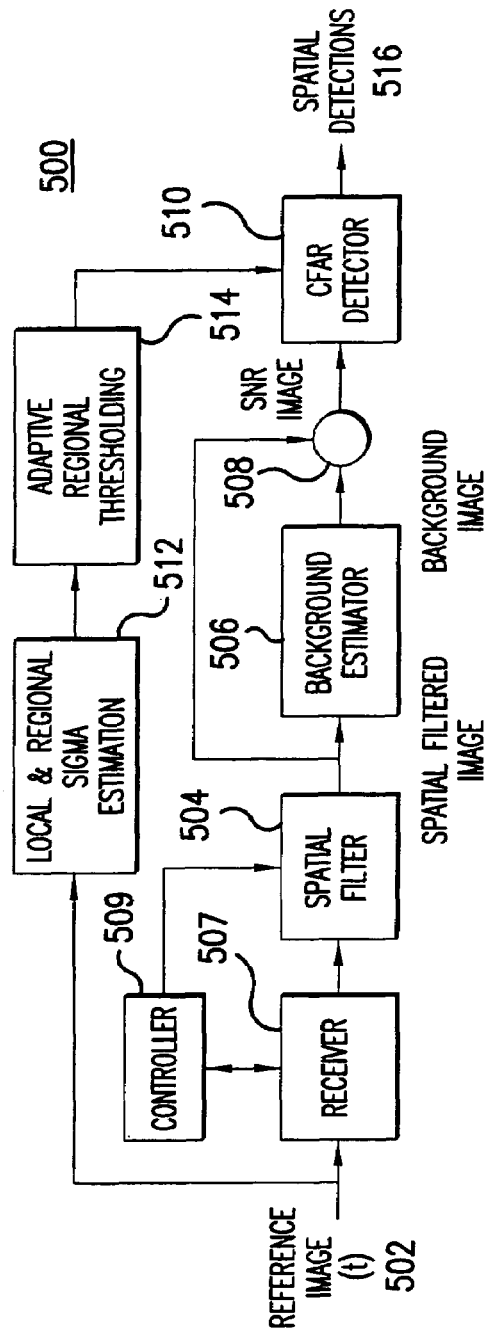
FIG. 5 is a block diagram of an exemplary adaptive IRST image processing system using adaptive spatial filtering.
Figure 6:
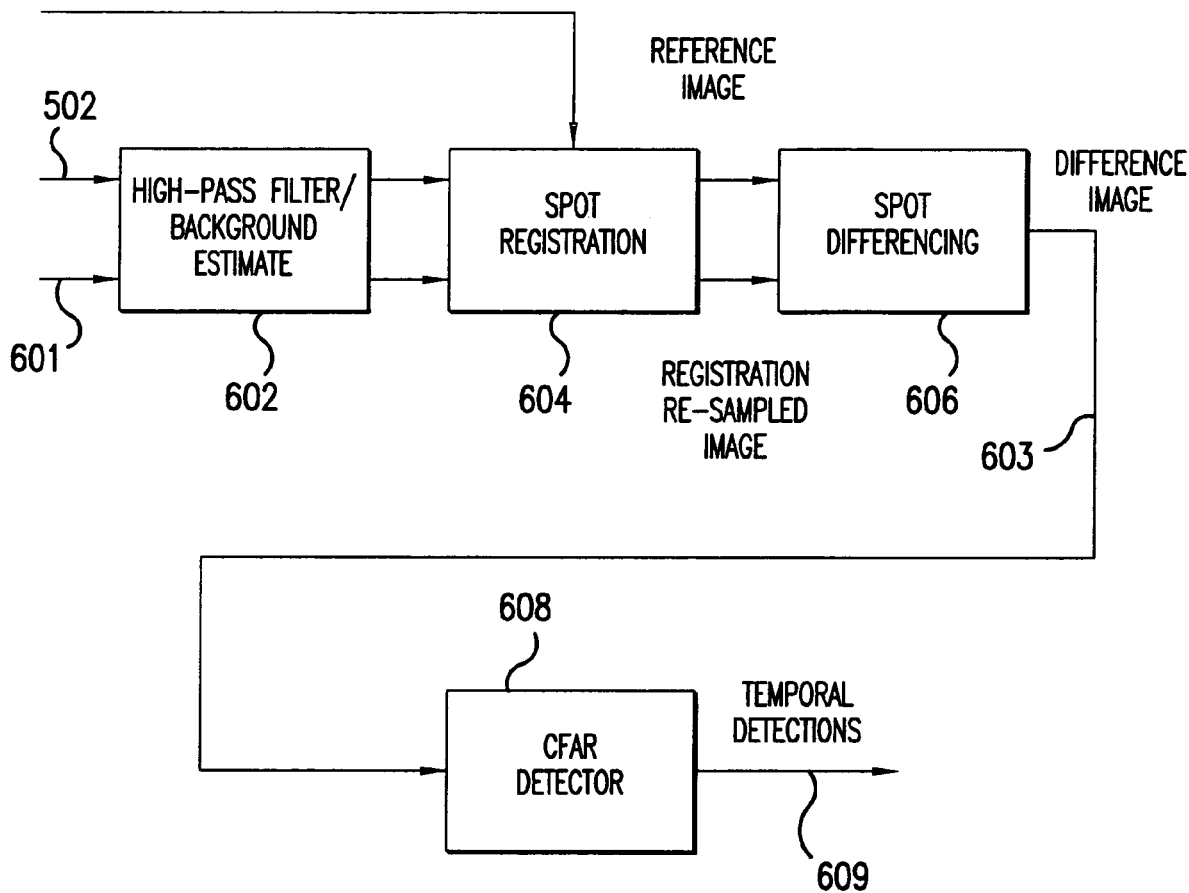
FIG. 6 is a block diagram of an exemplary adaptive IRST image processing system using spot time-differencing.

It has been determined that a spot time-differencing (STD) process of the type described in International Patent Application Number PCT/US2004/005325 and illustrated in FIG. 4 could considerably reduce false detections in the heavy background situation. However, it has also been found that for a sequence of IR images, for some images the STD suppresses the false detections quite well, but in some other frames the STD does not performs as well. The variance of performance at different image frames is mainly caused by the random phasing of the background clutters falling into different portions of the discrete pixels in the current and previous image frames (the two images that are used for time-differencing).

The optical flow can cause this variation of performance. Optical flow is effected by the speed of the aircraft. For example, if the optical flow is exactly 20 (or 30) pixels between these two frames, a false detection falling in the center of a pixel in the previous frame will also occur in the center of the pixel in the current frame, and this pixel's x-y coordinates are 20 (or 30) pixels away from the pixel in the previous frame. These two pixels in the two frames are related by the spot registration process developed in the time-differencing system of International Patent Application Number PCT/US2004/005325. Then, the pixel value in the current frame is subtracted by the pixel value in the previous frame (time-differencing) to cancel out this false detection. On the other hand, if the optical flow is not exactly 20 (e.g. 20.5), a false detection falling in the center of a pixel in the previous frame may occur in the corners or edges of the pixel in the current frame. In this case, the pixel value in the current frame may be smaller than the pixel value in the previous frame, and the STD may not cancel out this false detection depending on the CFAR threshold value.

It has been found that even though the Pds (probabilities of detection) in some single frames are low for a specific Pfa (probability of false-alarm) requirement, the overall Pd can be improved by the use of a post-detection temporal integration process across several frames (e.g., use 3-out-of-5, or 4-out-of-6 sequencing, etc.) in the inertial tracker. In the inertial domain, the detections in different frames are associated by the kinematical motions of the detections across times. Recently, with the progress of image processing techniques, however, many tracking functions can be conducted in the image domain by use of correlation techniques. However, so far all the correlation-based image trackers can only handle the extended detections with multiple pixels since the spatial profiles of extended detections are needed to conduct spatial correlation across time frames.

In the present invention, a multiple-frame-association (MFA) process for point detections (single pixel detections) by use of spot registration for optical flow estimation is disclosed. The MFA process can considerably reduce false detections by use of this multiple frame association technique. This technique can be further developed as a registration-based image tracker for point target detections. Preliminary results using real urban heavy clutter data show that the MFA technique of the present invention improves performance of the sytstem.

In the newly developed STD (spot time-differencing) system utilizing MFA, registration is conducted for each spot detection (obtained by spatial filtering) at the current frame related to the previous frame. Therefore, the exact previous locations of the current detections are known.

Pixel Shifts of Target Movements

Figure 8:
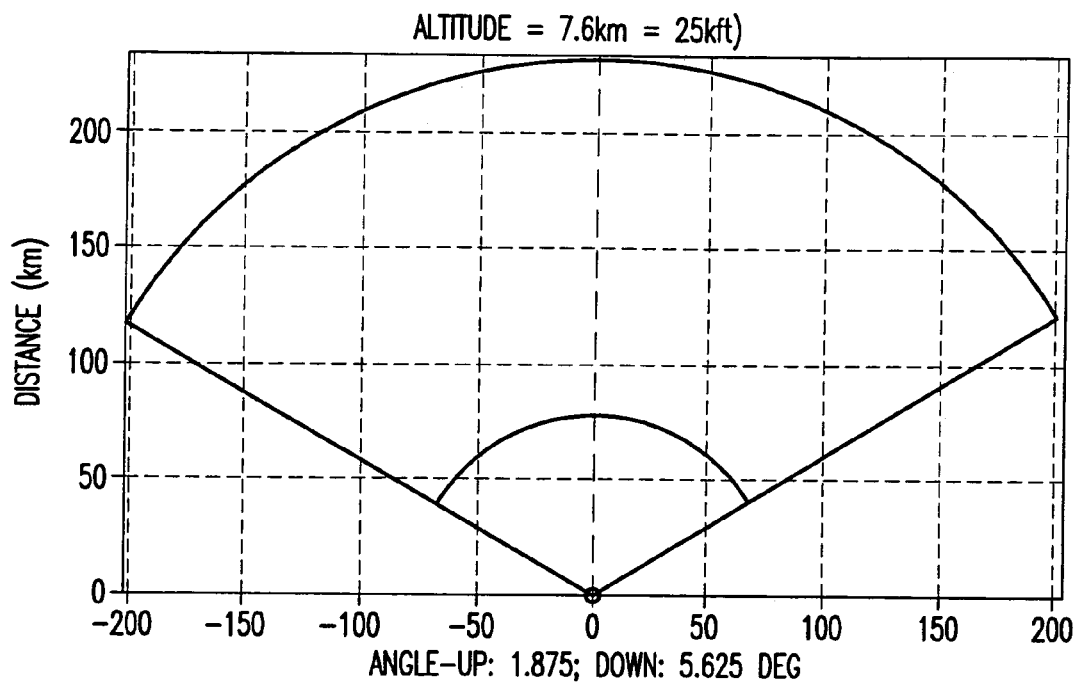
FIG. 8 is a top-view of a flight mission profile.
Figure 9:
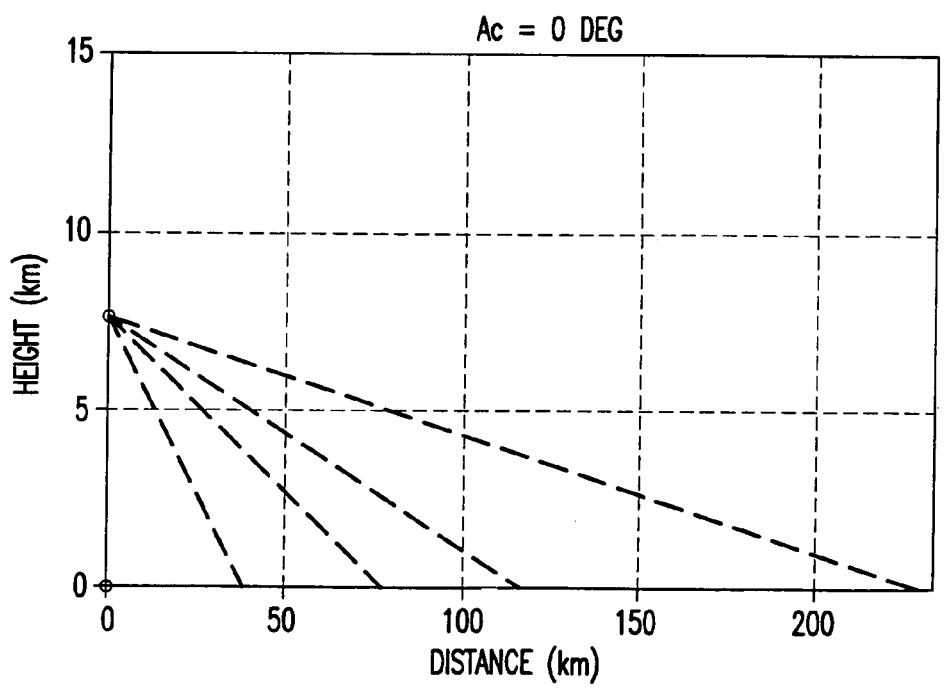
FIG. 9 is a side-view of a flight mission profile.
Figure 10A:
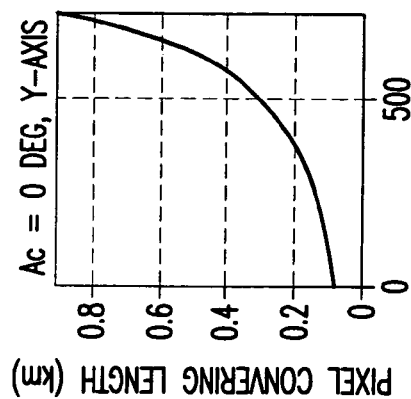
FIGS. 10a-10f include graphs of the Igth_x and Igth_y at different pixel y-locations.
Figure 10B:
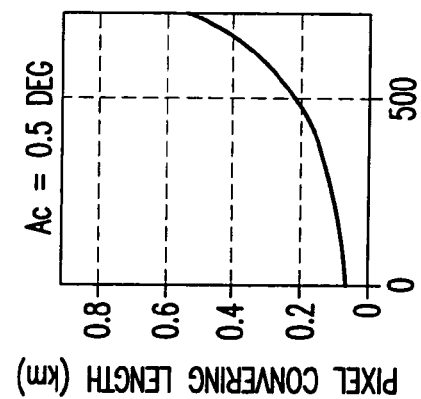
Figure 10C:
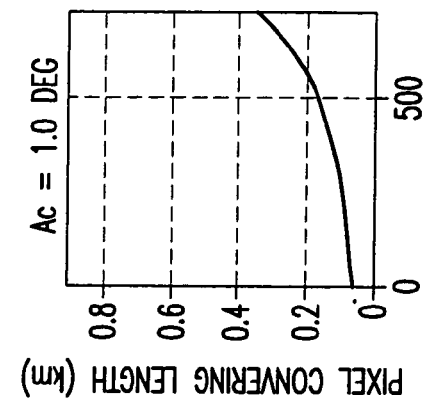
Figure 10D:
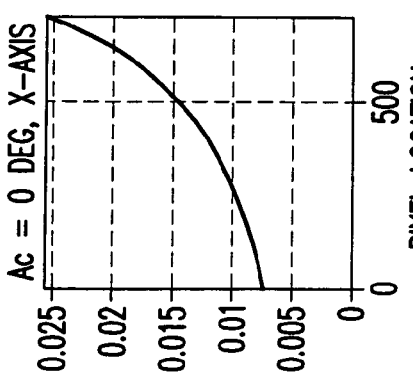
Figure 10E:
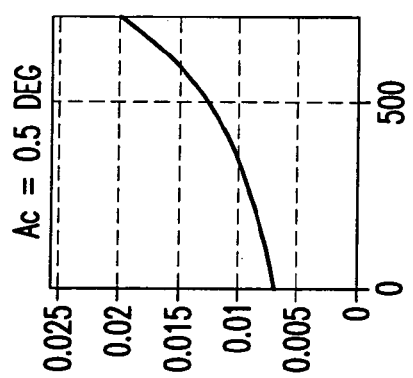
Figure 10F:
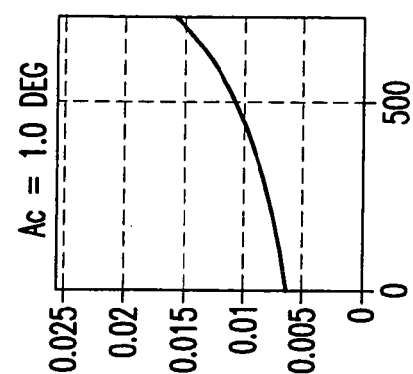

Before the MFA is discussed in detail, it is helpful to show how to estimate the pixel shifts across the FPA (focal plane array) for a moving object with a constant velocity. The pixel shift is a function of a pixel's covering length along the x- and y-directions: lgth_x and lgth_y. The lgth_x and lgth_y themselves are functions of the altitude difference between the sensor and the moving object, the sensor look-down angle, and the pixel location in the FPA. The top-view and the side-view of a specific flight mission profile are shown in FIGS. 8 and 9, respectively. FIG. 8 is a top-view that illustrates the field of view. FIG. 9 is a side-view that illustrates the look-down angle.

The lgth_x and lgth_y can be estimated using equations (1) and (2):

$$lgth\_x(j)=alt\_d/\tan(ld\_angl-ifov*j+ifov)*ifov, \quad (1)$$

$$lgth\_y(j)=alt\_d/\tan(ld\_angl-ifov*j)-alt\_d/\tan(ld\_angl-ifov*j+ifov), \quad (2)$$

where alt_d is the altitude difference, j is the pixel location at the FPA (e.g., for a 1 024×1 024 FPA, j=1 at the lower edge, and j=1024 at the upper edge), ld_angl is the look-down angle (in radiance) at the lower edge (j=1), and ifov is the pixel subtend angle in radiance.

For a specific mission profile: alt_d=25 kft, as shown in FIG. 10, we plot the estimated lgth_x and lgth_y for three different ld_angl: Ac=0 (ld_angl=5.625) deg, Ac=0.5 (ld_angl=6.125) deg, and Ac=1 (ld_angl=6.625) deg, where Ac is the LOS angle of the upper bar center pixel.

Based on the estimated lgth_x and lgth_y, we can calculate the pixel shift of a moving object at a specific velocity and moving direction. For example, for a target with a constant velocity of 0.9 Mach, The moved distance in 1.33 sec. (RT) is 0.4 km. The pixel shift of the target movement is a function of the pixel's y-location. For example, for Ac=0.5deg, y-location=500, from FIG. 10 we found that the pixel covering length along the y-direction is about 0.2 km and the pixel covering length along the x-direction is 0.0125 km. Therefore, if the target moves along the y-direction, then Pixel Shift=0.4/0.2=2 pixels. If the target moves along the x-direction, Pixel Shift=0.4/0.0125=32 pixels. For any other moving direction, the Pixel Shift should be between 2 and 32 pixels. The above estimation allows us to set a tracking gate for a detection at a specific y-location across frames. The tracking gate is a regional area in the previous image with its center located at the previous location of a current detection in the current image. All the detections inside the gate will be established associations with this current detection for tracking records. A larger gate will provide association for objects with lager motion. However, the computational load may be prohibitively increased.

The MFA Algorithm

Figure 19:
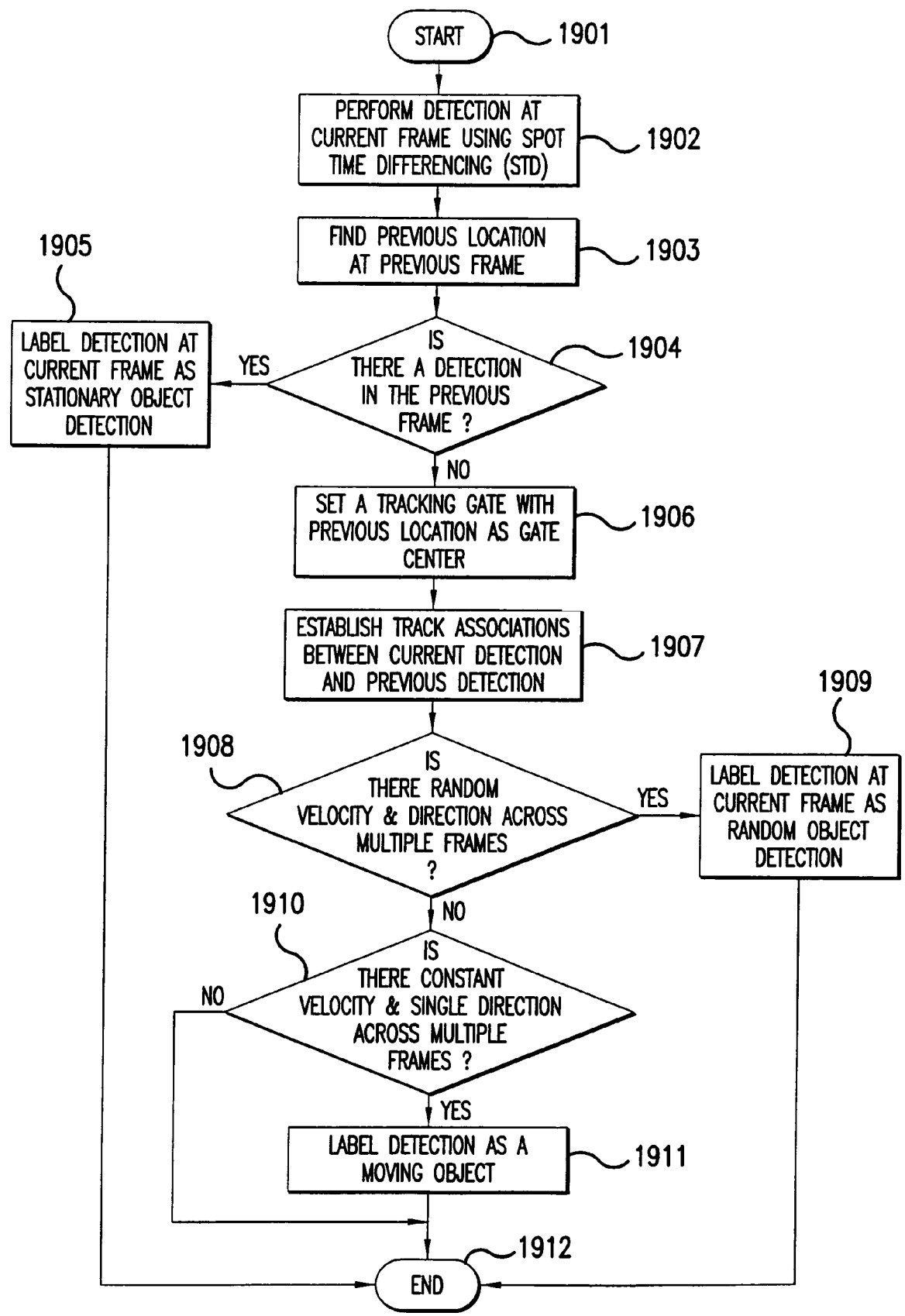
FIG. 19 is a flow chart illustrating an algorithm associated with the present invention.

The MFA algorithm which is preferably implemented in software as part of the Spot ChanageIRST funtion 408' is illustrated in the flow diagram of FIG. 19 and described in more detail below:

1. The algorithm is initiated in a starting step 1901. In step 1902, detection is performed at a current frame. For each detection after time-differencing at the current frame, based on its optical flow estimated by spot registration from STD, its previous location at the previous frame is found in step 1903. If it is determined that there is detection at this previous location in step 1904, the detection at the current frame is labeled as stationary object detection in step 105.
2. If the previous location is not a detection, then in step 1906 a tracking gate is set with the previous location as the gate center. The gate size is determined using the moving object Pixel Shift algorithms discussed above.
3. In step 1907, track associations are established between the current detection and all the previous detections within the gate.
4. If it is determined in step 1908 that the detection moves at random velocity and random directions across multiple frames, the detection track is more likely caused by temporal noise, and the detection is labeled as random object detection in step 1909.
5. If it is determined in step 1910, that the detection moves at a constant velocity and at a single direction across multiple frames, the detection track is more likely to be a moving object with a constant velocity, and this detection is labeled as moving object detection in 1911.

Figure 11A:
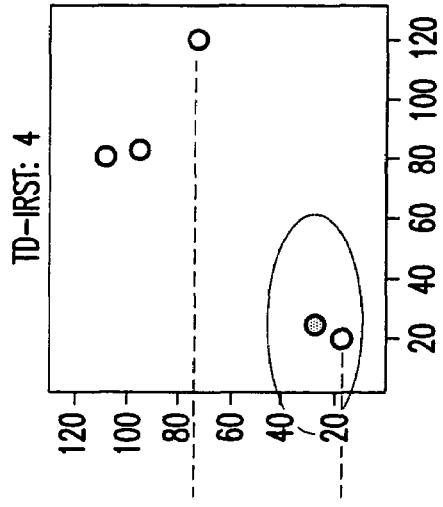
FIGS. 11a-11d includes charts that illustrate multiple frame association.
Figure 11B:
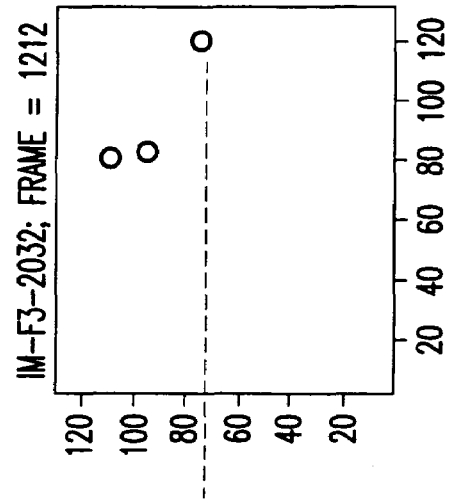
Figure 11C:
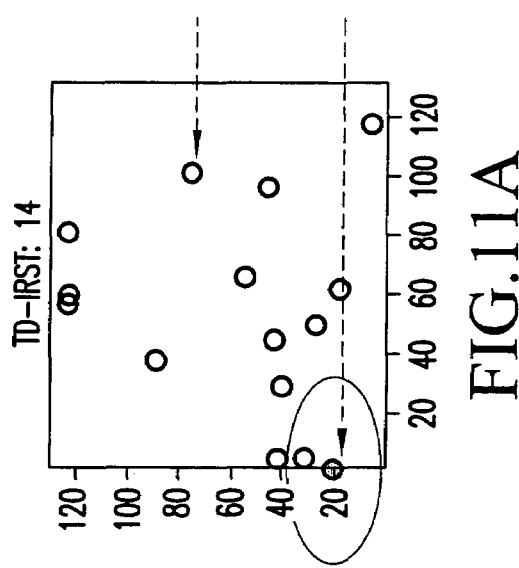
Figure 11D:
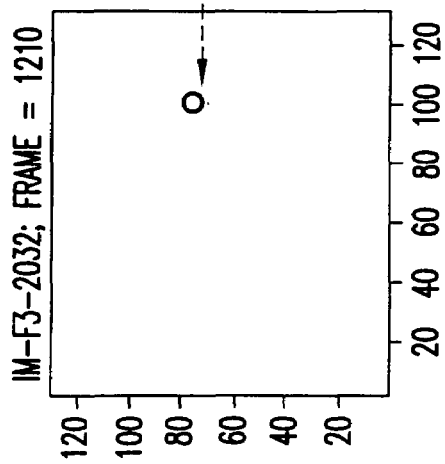
Figure 12A:
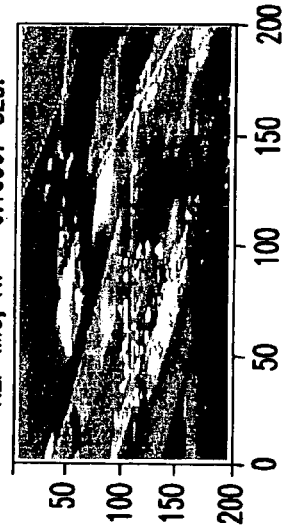
FIGS. 12a-12f includes graphs and photos of heavy urban clutter.
Figure 12B:
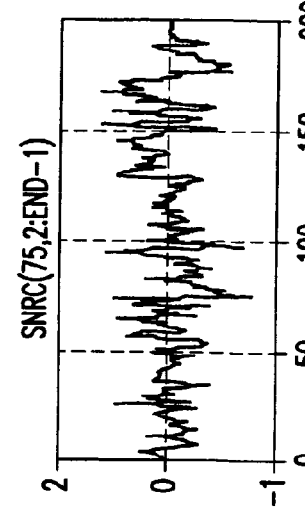
Figure 12C:
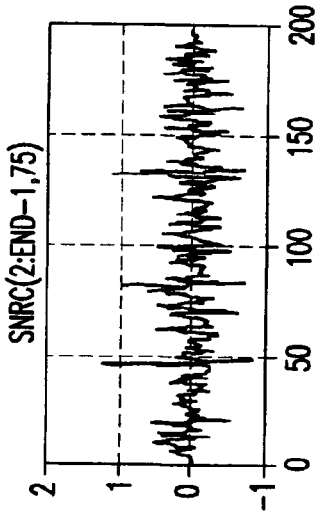
Figure 12D:
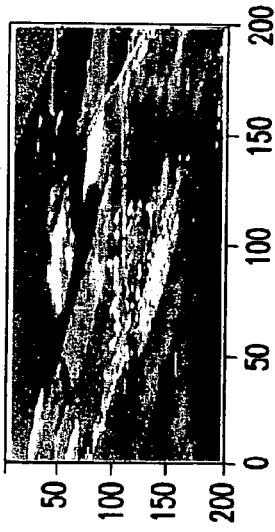
Figure 12E:
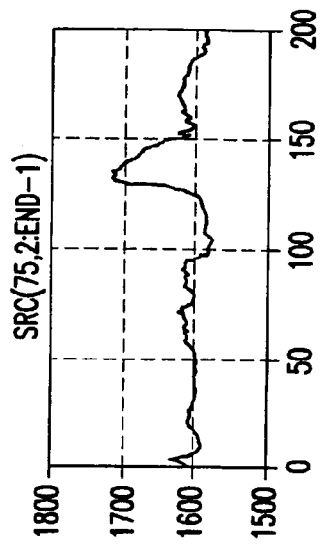
Figure 12F:
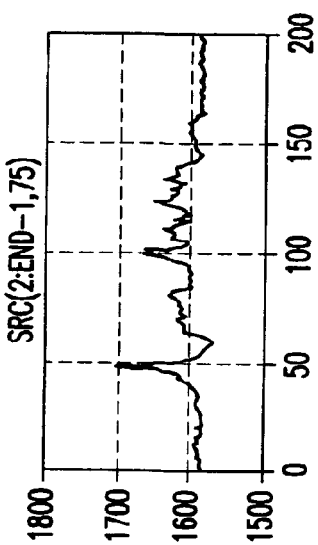

In the application of IRST, the detection of moving targets is of primary interest. Accordingly, stationary object detections and random object detections can be removed, and the system can keep track of the moving object detections. For example, stationary object detections and random object detections are shown in FIGS. 11a-11d as circles. FIG. 11a illustrates a previous frame having a relatively low threshold, and FIG. 11b illustrates a current frame also having a relatively low threshold. In FIG. 11a, the open circles represent fourteen false detections, and in FIG. 11b, the open circles represent four false detections. The filled-in circle in both FIGS. 11a and 11b are the centers of elliptical tracking gates. FIG. 11c illustrates a previous frame having a relatively high threshold, and FIG. 11d illustrates a current frame also having a relatively high threshold. In FIG. 11c, the open circle represents a single false detection, and in FIG. 11d, the three open circles represent three false detections. The open circles, therefore, represent false detections from a heavy urban background clutter after spot time-differencing using both a relatively low threshold and a relatively high threshold. Although results from only two frames are shown in FIG. 11, in reality, a moving time window of more than two frames (e.g., 2-out-of-3 or 4-out-of-6 moving window sequences, etc.) should be used to reduce the impacts caused by temporal noise.

Referring now to FIG. 12, the image data sequence used is a look-down of small town heavy clutter. Frame number 1212 and 1210 are shown in FIGS. 12(a) and (b), respectively. FIG. 12a depicts a current frame of a scene image, and FIG. 12b depicts a previous frame of the scene image. One thousand SMF (small military fighter) targets were unifommi-randomly inserted into the scene images. In FIG. 12c, a graph depicts a slice of raw data from the scene image of FIG. 12a. In FIG. 12d, a graph depicts the data of FIG. 12c after it has been spatially filtered using a high pass filter. In FIG. 12e, a graph depicts a different slice of raw data from the scene image of FIG. 12a. In FIG. 12f, a graph depicts the data from FIG. 12e after it has been spatially filtered using a high pass filter. Detection performance for spatial IRST and spot time-differencing IRST processes can be evaluated using ROC curves as described in U.S. patent application Ser. No. 10/748,212. For example, the estimated optical flow between the current frame and the previous frame of FIGS. 12a and 12b are OpFl_x=20 pixels, and OpFl_y=1 pixel.

Figure 13B:
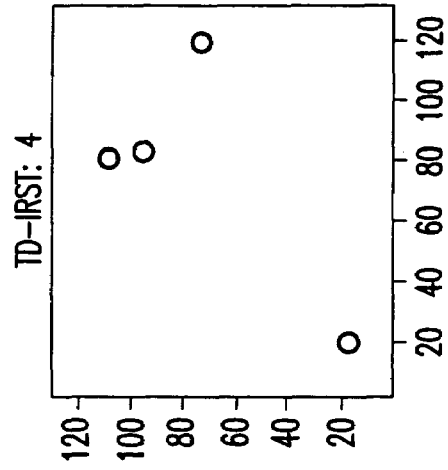
FIGS. 13a-13d are graphs illustrating false detections of spatial IRST and spot time-differencing IRST.
Figure 13D:
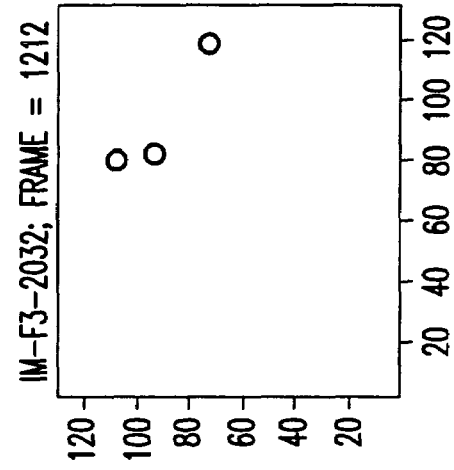
Figure 13A:
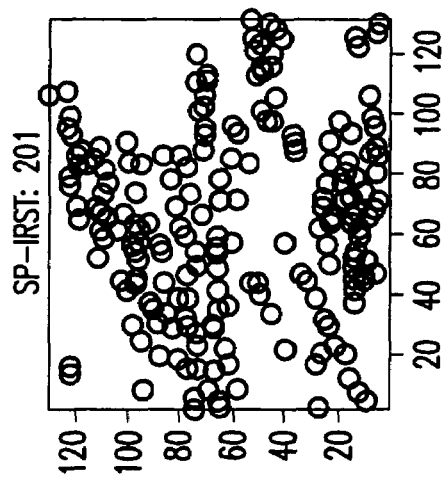
Figure 13C:
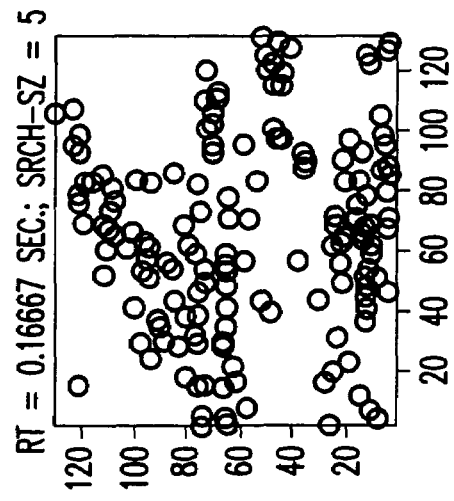

False Detections of Spatial IRST and Spot Time-Differencing IRST are shown in FIGS. 13a-13d. Frame number 1212 served as the current frame, and Frame number 1210 served as the previous frame. The top two plots of FIGS. 13a and 13b showed the false detections at a specific CFAR threshold resulting in Pd=86%, and the bottom two plots of FIGS. 13c and 13d showed the false detections at a higher CFAR threshold resulting in Pd=78%. The left plots FIGS. 13a and 13d are the results from Spatial IRST process, and the right plots FIGS. 13b and 13d are the results from Spot Time-Differencing IRST process. It was found that STD can considerably further reduce false detections after spatial only detection process, and the false detections are reduced from two hundred and one (Spatial Detection of FIG. 13a) to four (STD Detection of FIG. 13b).

Figure 14A:
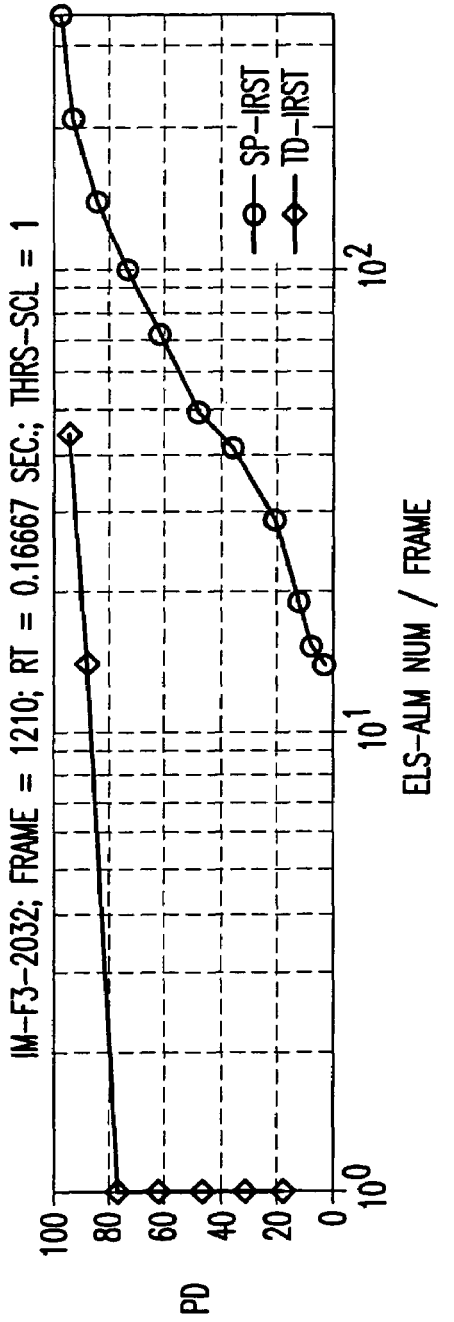
FIGS. 14a and 14b are graphs illustrating ROC performance for Frame number 1210.
Figure 14B:
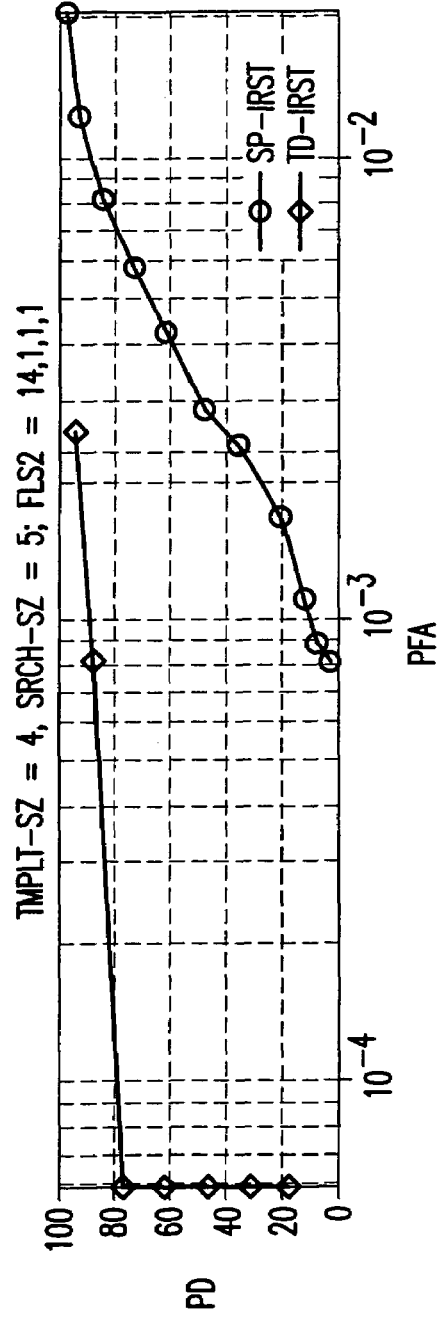
Figure 16A:
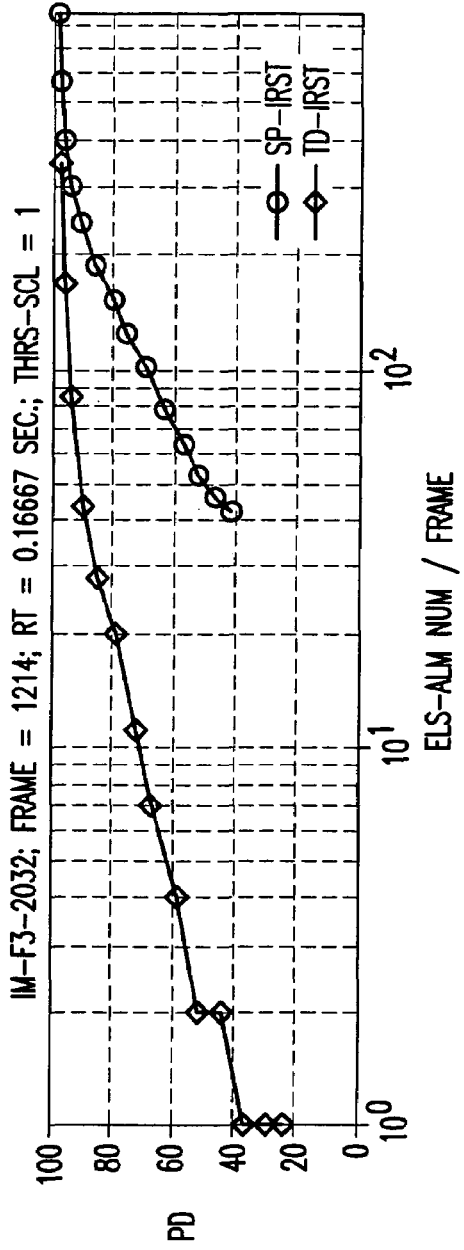
FIGS. 16a and 16b are graphs illustrating ROC performance for Frame number 1214.
Figure 16B:
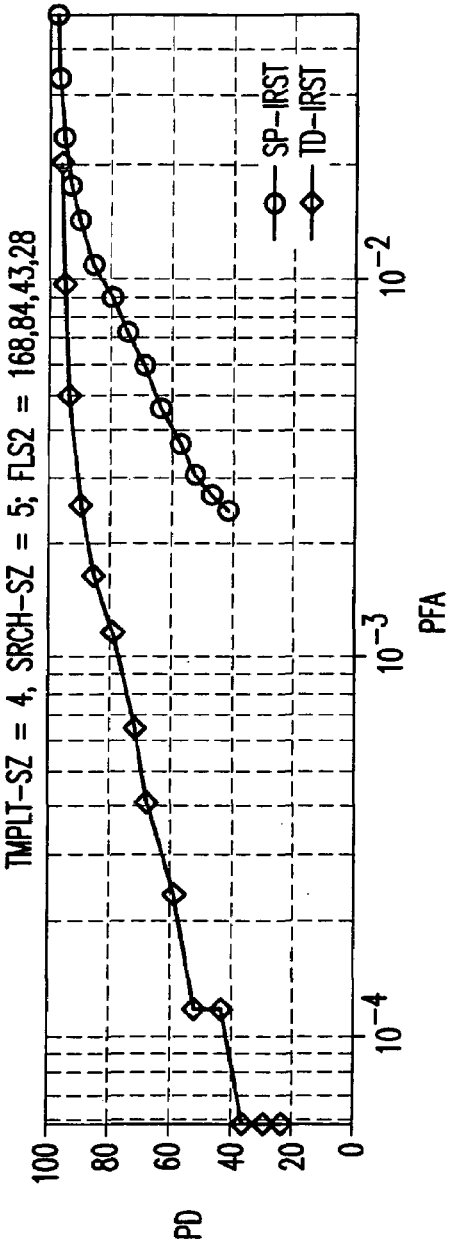
Figure 17A:
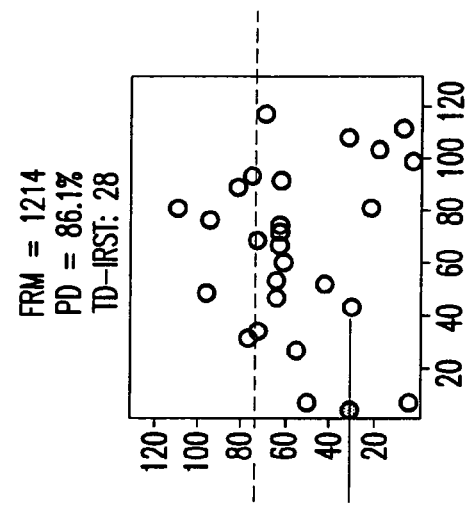
FIGS. 17a-17f include charts illustrating multiple frame association for false detections.
Figure 17B:
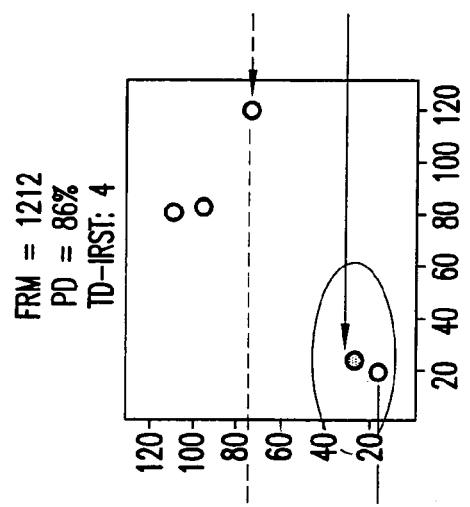
Figure 17C:
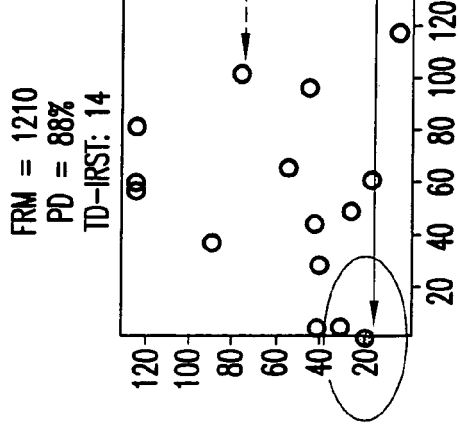
Figure 17D:
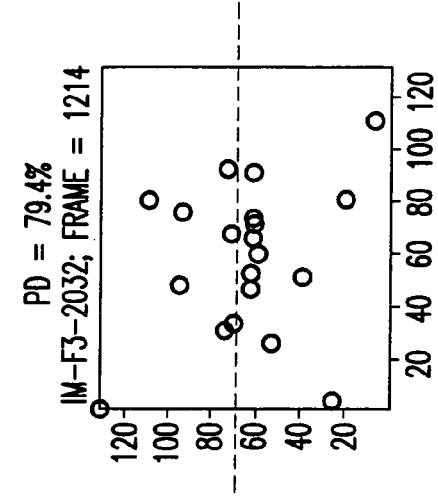
Figure 17E:
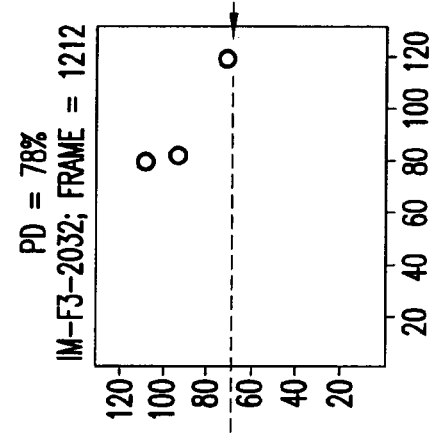
Figure 17F:
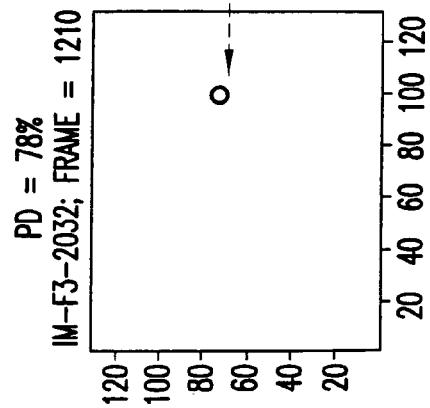

The results of detection performance are shown in FIGS. 14-16 for a time window of three frames (frame numbers: 1210, 1212, 1214). ROC curves for both the spatial process and STD process were plotted. For Pd=80%, Pfa (Probability of False-Alarm) of the spatial process are 7E-3, 8.5E-3, and 9E-3 for Frame 1210, 1212, and 1214, respectively, and Pfa of the STD process are 1.5E-4, 1.9E-4, and 1.2E-3 for Frame 1210, 1212, and 1214, respectively. It is found that the spatial process performance for the three frames are quite similar. However, the STD performance of Frame 1214 is much worse than those of the other two frames. For a 1024×1024 FPA size, a Pfa=1.2E-3 means more than 1200 false detections. As discussed above, the performance variance across frames is caused by the random phasing of the clutter falling on the pixels. FIGS. 14-16 show that the false detections can be further reduced by applying MFA (multiple-frame-association) process.

The false detections in open circles for the three frames are displayed in FIG. 17. The top three plots showed false detections for Pd=86~88%, and the bottom three plots showed false detections for Pd=78~79% using a higher detection threshold. It is seen that for frame 1214, there are more false detections than the two previous frames. The estimated optical flows and the false detections between two frames are about 20 pixels moving to the left-side along the x-direction, and about 1 pixel moving to the upper-side along the y-direction. Based on the MFA algorithm description discussed above, for the case of Pd=78% (the bottom three plots in FIG. 17), One stationary object detection association is established as indicated by the dashed arrows in FIG. 17.

There are more false detections in the three top plots when using a lower CFAR threshold for Pd=86~88%. One random object detection association is established as indicated by the solid arrows in FIG. 17. The two solid circles in Frame 1210 and 12 are the two previous locations of the two detections in Frame 1212 and 1214 as associated by the two solid arrows. Then by using the two solid circles as the tracking gate centers, we build two tracking gates whose sizes are based on the estimations of moving object pixel shifts. There is one detection inside each of the tracking gate. The tracking gate in the middle indicates that the detection moves from south-to-north, while, the tracking gate in the left indicates that the detection moves from north-to-south. This conflict allows us to classify this detection association as random object detection. Since there is no moving object detection association (with constant velocity) that can be established from the detections in FIG. 17, for this three-frame example, we can reduce the Pfa to zero as compared with the single frame Pd=1.2E-3 for Frame 1214.

Referring now to FIG. 18, to further demonstrate that the MFA technique can reliably associate the moving object detections, we inserted two moving SMF targets with constant velocities into the clutter scenes of frames 1210, 1212 and 1214. Target 1 is moving from top to down along the y-direction with a constant velocity that will cause 5 pixel-shrifts during the time interval between two frames, and Target 2 is moving from right to left along the x-direction with a constant velocity that will cause 40 pixel-shrifts during the time interval between two frames. The two multiple frame associations related to the two targets are shown in the bottom three plots in FIG. 18 as indicated by the Dash-Dotted arrows. The two targets are plotted as the open circles with the 'x' symbols inside. It is found that Target 1 moves in the same direction in the two tracking gates (from north-to-south) and also moves in the same velocity (5 pixel shifts). Similarly, Target 2 moves in the same direction in the two tracking gates (from right-to-left) and also moves in the same velocity (40 pixel shifts).

In summary, an MFA (multiple-frame-association) process is a novel technique that can help to further reduce false detections after IRST time-differencing process for detecting unresolved SMF targets. Preliminary results show that MFA process can reliably classify the detections into three categories: stationary objects, randomly moving objects (mostly caused by temporal noise), and moving objects with constant velocities. In IRST applications, we are only interested in detecting airborne moving targets, and thus the MFA process will keep tracking detections moving with constant velocities, and remove stationary and randomly moving detections. MFA process can be further implemented in other applications (such as missile seekers, FLIR detectors, etc.) where stationary target detection (such as stationary tanks, buildings, etc.) is also required. MFA process can be used to classify stationary objects from randomly moving objects and moving objects with constant velocities. MFA process can be used complementary to the inertial tracker. That is, we can first use MFA to reduce false detections (especially the stationary false detections in heavy background clutter) before passing the detections to the inertial tracker. MFA process can be further developed as an independent tracker for unresolved targets in the image domain for lower cost applications and provide higher tracking accuracy. In inertial trackers, accurate range information is needed to compensate the sensor movement (the optical flow). However, errors will occur from detections that scatter at different altitudes, such as detections from airborne targets, or from mountains and clouds, etc. MFA will not have such a problem since the optical flow is accurately estimated for each detection by use of spot registration.

What is claimed is:

1. A method for detecting and tracking objects, comprising:
   receiving image data from a sensor field of view, said image data including a current frame having a reference image and a previous frame having a search image;
   classifying the clutter in the image data to determine whether the image data includes relatively low clutter or relatively high clutter;
   spatially filtering multiple frames of the image data to determine a potential moving object, when the image data includes relatively low clutter;
   spot time-difference processing multiple frames of the image data to determine a potential moving object, when the image data includes relatively high clutter; and
   detecting a moving object from the multiple frames of image data that have been processed.

2. A method according to claim 1 wherein the spot time-difference processing of multiple frames of image data, having spots which correspond to potential moving targets, includes:
   registering the spots from at least a first current frame of a reference image and the spots from at least a first previous frame of a search image;
   registering the spots from at least a second current frame of a reference image and the spots from at least a second previous frame of a search image;
   determining the velocities and directions of the registered spots from the multiple frames of data.

3. A method according to claim 2, wherein the determining step further includes establishing tracking gates in each current frame and corresponding previous frame.

4. A method according to claim 3 wherein the object is determined to be a stationary object if its location does not change between the current frame and the previous frame.

5. A method according to claim 3 wherein the object is determined to be a random object if its velocity and direction is random over multiple frames.

6. A method according to claim 3 wherein the object is determined to be moving object if its velocity and direction is constant over multiple frames.

7. A method according to claim 3 wherein the registering steps include aligning the pixels in the corresponding current frames and previous frames.

8. A method according to claim 3 wherein the determining means includes establishing a threshold to minimize false detections.

9. A method according to claim 3 wherein the determining step results in the detection of stationary objects and randomly moving objects.

10. A method according to claim 2 wherein the spots are spatially filtered prior to being registered.

11. A method according to claim 1 which further includes the step of spatially filtering the image data in order to detect a spot and registering each detected spot prior to spot time difference processing the image data.

12. A system for detecting and tracking objects, comprising:
    at least one sensor;
    a receiver for receiving image data from the sensor, said image data including a reference image and a search image; and
    a processor for classifying the clutter in the image data to determine whether the image data includes relatively low clutter or relatively high clutter, for spot time-difference processing multiple frames of the image data when the image data includes relatively high clutter, and for detecting a moving object from the multiple frames of image data that have been spot time-difference processed.

13. A system according to claim 12 wherein the reference image is a current frame and the search image is a previous frame.

14. A system according to claim 12 which further includes a spatial filter for spatially filtering the image data.

15. A system according to claim 14 wherein objects are detected using both spot time-difference processed images and spatially filtered images.

16. A system according to claim 12 wherein the processor detects stationary objects and randomly moving objects.

17. A system according to claim 12 which further includes the step of spatially filtering the image data in order to detect a spot and registering each detected spot prior to spot time difference processing the image data.

18. A system according to claim 12 wherein the sensor is an infrared sensor.

19. A system according to claim 12 which further includes the step of spatially filtering the image data when the image data includes relatively low clutter.

* * * * *